United States Patent [19]

Frost et al.

[11] 3,854,996

[45] Dec. 17, 1974

[54] METHOD FOR REMOVING MAGNETITE SCALE

[75] Inventors: Jack G. Frost; John A. Knox; Larry D. Martin, all of Duncan, Okla.

[73] Assignee: Halliburton Company, Duncan, Okla.

[22] Filed: Apr. 27, 1972

[21] Appl. No.: 248,278

[52] U.S. Cl............................ 134/2, 134/3, 134/41, 252/87
[51] Int. Cl............................ C02b 5/06, C23g 1/06
[58] Field of Search........ 134/2, 3, 41; 252/87, 389; 260/932

[56] References Cited
UNITED STATES PATENTS

| | | | |
|---|---|---|---|
| 2,959,555 | 11/1960 | Martin et al. | 134/3 X |
| 3,000,767 | 9/1961 | Elliott | 134/3 |
| 3,248,269 | 4/1966 | Bell | 134/2 X |
| 3,634,257 | 1/1972 | Porter et al. | 134/41 X |

OTHER PUBLICATIONS

Grosvenor, ed., Basic Metallurgy, Vol. 1, Amer. Society For Metals, Cleveland, Ohio, (1954), p. 69.

Primary Examiner—Morris O. Wolk
Assistant Examiner—Timothy W. Hagan
Attorney, Agent, or Firm—Thomas R. Weaver; William R. Laney; John H. Tregoning

[57] ABSTRACT

A method for removing magnetite scale from a metallic substrate comprising contacting the scale with a composition which is an aqueous solution consisting essentially of at least 0.5 weight percent of a polyphosphonic acid, or an alkali metal or amine salt of such acid, with the acid being selected from the group of acids having the formulae:

(1)

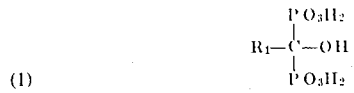

where $R_1$ is selected from the class consisting of $C_1$—$C_{12}$ alkyl groups, and the group

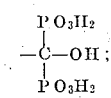

and (2)

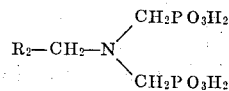

where $R_2$ is selected from the class consisting of —H, —$PO_3H_2$, $C_1$—$C_{12}$ alkyl groups, and the group

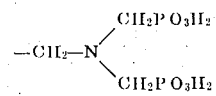

The scale is removed from the metallic substrate by contacting the described scale-bearing substrate with the described composition at a pH which is preferably between about 4 and about 10.5, and at a temperature of from about 180°F to about 300°F.

A preferred embodiment of the aqueous solution further contains, as a buffering or pH adjusting material, a basic amine compound or an alkali metal hydroxide.

14 Claims, No Drawings

METHOD FOR REMOVING MAGNETITE SCALE

This invention relates to methods for effecting the removal of scale from metallic substrates.

In steam boilers, feed water heaters and associated piping, and in various types of pressure vessels in which water is circulated and heat transfer occurs, water insoluble salts deposit on the metallic interior surfaces. Among other types of scale deposits which occur, the encrustation of the surface with tightly adherent and low porosity magnetite ($Fe_3O_4$) and with copper scale is often encountered. The scale must be periodically removed and the metal surfaces cleaned to restore efficient heat transfer, prevent burnouts due to hot spot development, and reduce restriction of the flow of fluid through the scale-blocked apparatus.

Various scale removing compositions have previously been employed. Inorganic acids, such as hydrochloric and phosphoric acid, and organic acids, such as tartaric acid, oxalic acid and citric acid, have been used to dissolve iron oxide scale. Alkali metal and amine salts of alkylene polyamine polyacetic acids have also been used to remove iron oxide deposits from ferrous metal surfaces.

After descaling, the spent treating solution is drained from the metallic structures treated, flushed with water, and, if an acid treating solution has been used, neutralized with an alkaline solution, and then again flushed with water. In some instances, such as the ammoniated ethylene diamine tetraacetic acid treating solutions, cleanup of the boiler or other apparatus treated, disposal of the treating solution and regeneration of the active treating material, are problems which are confronted in many instances due to the high solubility of the dissolved iron and of calcium salts in the treating solution. Some of the previously used treating solutions are also limited in the temperature and pH conditions under which they function effectively, and thus restrict the environments in which they may be utilized. The mineral acid treating solutions are limited in their usefulness due to their propensity to attack and corrode ferrous metals.

As a different approach to the problem of scale encrustation on metal substrates, scale inhibiting compositions of various types have been added to aqueous solutions which contact such substrates, and which contain ionic species capable of forming insoluble precipitates which are precursors of undesirable scale adherent to the substrate. One general class of scale inhibiting compositions which have been employed can be identified as chelating or sequestering compounds. Mechanistically, two types of scale inhibiting activity have been attributed to these compounds. First, where a so-called "threshold" amount or "subthreshold" amount of the sequestering compound is used, sequestration of scale-forming cations in the aqueous solution either does not occur, or occurs incompletely. Rather, the presence of the sequestering compound appears to inhibit reaction of scale-forming cationic species with scale-forming anionic species to a degree such that the solubility in water of the resultant reaction product is not exceeded and no precipitation occurs. Subsequent scale formation is thus minimized.

In another mechanism by which scale formation can be inhibited by the use of sequestering agents, an amount of these materials is incorporated in the aqueous solution which is at least equal to, and usually far exceeds, the stoichiometric quantity required to completely sequester all of the scaleforming cations present in solution. A complex is then formed by reaction between the sequestering agent and such cations, in preference to the deleterious scale-forming compounds which would otherwise be produced by the reaction between the offending cations and certain anions in the solution. The complex thus formed may be either soluble or insoluble in water, depending upon the particular sequestrant used, the cation sequestered, and the quantitative ratio of one to the other. In either case, however, the formation of an adherent scale on the metal is inhibited.

Both of the described scale inhibiting mechanisms attributed to sequestering agents are based on the prevention of ions in the aqueous solution from combining to form insoluble scaly compounds or encrustations. Where the sequestration mechanism per se functions to complex the offending cations, the latter ions exist in the solution in their electropositive state, and combine readily with the sequestrant to form coordination complexes. In some cases, sequestering agents will form coordination complexes with cations in aqueous solutions, but will not effectively chelate or sequester surface metal atoms, or atoms bound in a scale compound, such as $Fe_2O_3$ and $Fe_3O_4$. The prior literature has not recognized chelating capability of this latter type as characterizing polyphosphonic acid compounds and their salts, although they have been widely used as scale inhibitors which will complex dissolved scale-forming cations.

We have now surprisingly determined that certain polyphosphonic acids and their salts, in aqueous solution, actually appear to directly complex iron atoms bound in magnetite ($Fe_3O_4$) molecules as scale present on metal substrates, and that the resulting coordination complex then undergoes solution, so that by this means, the scale can be substantially completely removed. Cuprous compounds in scale encrustations are also susceptible to removal by this method. Although the precise mechanism underlying such scale removal procedure is not certainly known, it is believed to be analogous to that postulated by Donahue et al. in *Journal of the Electrochemical Society*, 114, 1006–1011 (1967), and specifically illustrated by Equations 1a and 1b on Page 1007 of that report. The phosphonate complex is believed to undergo charge transfer, permitting it to be dissolved from the scaly surface and enter solution.

The present invention is a method for effectively removing iron oxide scale from ferrous metal substrates. The composition utilized in practicing the method can be broadly described as an aqueous solution consisting essentially of at least 0.5 weight percent, and preferably less than 7.5 weight percent, of a polyphosphonic acid, or an alkali metal or amine salt of such acid, with the acid being selected from the group consisting of acids having the formulae:

(1)
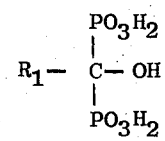

where $R_1$ is selected from the class consisting of $C_1$–$C_{12}$ alkyl groups and the group

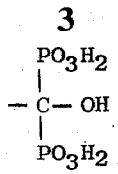

and (2) 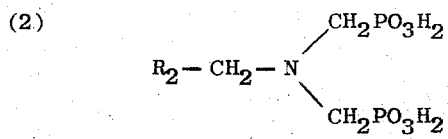

where $R_2$ is selected from the class consisting of —H, —$PO_3H_2$, $C_1$–$C_{12}$ alkyl groups, and the group

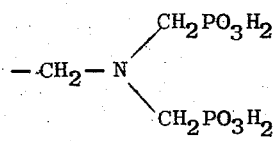

The aqueous solution can further contain, as a buffering or pH adjusting material, a basic amine compound or an alkali metal hydroxide compound which is compatible with the acid or salt which is the primary and functional sequestrant or chelating agent for the magnetite in the composition as identified in the preceding paragraph. Finally, the composition can contain an effective amount of an oxidizing material capable of oxidizing ferrous iron to ferric iron and metallic copper to cupric ions.

The process of the invention can be broadly described as comprising contacting the scale bearing metal with the described aqueous solution at a temperature of from about 140°F to about 300°F, at a pH of from about 4 to about 10.25.

In another of its aspects, the invention contemplates a clean-up procedure in which a solution containing the sequestrant-iron complex formed as described is treated with a calcium salt to form an insoluble sequestrant-calcium complex which precipitates from the solution. The displaced iron then also precipitates from the solution as iron oxide.

As will be apparent from this broad description, the composition used in the invention is relatively simple in constitution and is easily formulated. Moreover, the scale removal method proposed is operative over a wide range of pH and temperature conditions, rendering it flexible and effective under a variety of cleaning conditions which may, for example, shorten the downtime of a boiler or its accessories, or may, in one instance, dictate metal treatment under acid conditions, and in another instance, under basic or alkaline conditions. It is further characteristic of this invention that when certain preferred species of the scale removal composition are employed, and the process is carried out near the upper end of the operative pH range, copper deposits can also be removed from the magnetite encrusted metal substrate—a use-engendered status of the metal walls of certain heat exchange apparatus which is not infrequently encountered. Zinc deposits are also easily removed by the compositions of the invention.

As a final aspect indicative of the value and utility of the present invention, the spent scale removal solution can be easily removed from vessels in which it has been used, and can be treated after removal to render disposal of waste effluents a simple, economic and ecologically satisfactory procedure.

Having broadly alluded to the method of the invention, and cited certain salient characteristics of the composition used in the method, the subsequent description herein will be directed to a consideration of certain preferred embodiments of the invention, and to a detailed description of these embodiments in conjunction with examples set forth as illustrative of typical practice of the invention and utilizing certain preferred embodiments of the invention. As has been previously stated, the active or effective component of the compositions used in the invention are certain organic polyphosphonic acids, or the amine or alkali metal salts thereof. In the most prevalent practice of the invention, an amine or alkali metal salt of one of the described acids will be utilized in the scale removal method, and such salts may be initially included in the aqueous solution admitted to the boiler or other vessel to be cleaned, or the salt may be formed in situ by addition of an appropriate amine or alkali metal hydroxide to the solution after it is in place.

The types of acid utilized may vary widely within the broad structural definition of such acids as hereinbefore set forth, but certain species are preferred because of their relatively high magnetite removal efficiency, and relatively high rates of scale removal. Preferred acids for use in the invention are alkylene polyamine polyalkylene polyphosphonic acids conforming to the structural formula last above identified, and 1-hydroxyalkylidine-1,1-diphosphonic acids. The most preferred acids are those which contain from 2 to 6 carbon atoms. Examples of these preferred acids are nitrilotri-(methylenephosphonic acid); 1-hydroxyethylidine-1,1-diphosphonic acid; 1-hydroxypropylidene-1,1-diphosphonic acid; N,N, N',N'-ethylenediaminetetra-(methylenephosphonic acid); n-butylnitrilo-di-(methylenephosphonic acid); N-methylnitrilodi-(methylenephosphonic acid); and N-ethylnitrilodi-(methylenephosphonic acid). The most preferred single sequestrant or chelating compound for utilization in the scale removal composition of the invention is 1-hydroxyethylidine-1,1-diphosphonic acid, and the amine and alkali metal salts of this acid.

Where salts of the described acids are used, or are formed in situ, the preferred cations involved in the salt formation are those derived from ammonia or ammonium hydroxide, ethylenediamine and alkali metal hydroxides. The most preferred single cationic species used in the salt formation is the ammonium ion. Since the action of the active material is a sequestering or chelating action in which the iron of the magnetite scale is chemically combined with the acid, or the salt derived from the acid, it is important that the presence of any competitive species of compound which would compete with the sequestering material in the tying up and dissolution of the iron be avoided or minimized. Since the alkali metal ions display some tendency to compete with the active ingredient in this respect, and the ammonium does not suffer this disadvantage, the ammonium constitutes the preferred cation in phosphonate salts used as the active ingredient. There are occasions, however, upon higher temperature usage of the cleaning process of the invention, where the volatility of ammonia may render its usage less desirable than the usage of the alkali metal hydroxides for salt formation due to the susceptibility of the system under such conditions to the shifting of pH from an optimum range upon volitilization of the ammonia.

It is believed that it will be beneficial, before further departure from the discussion of the basic compounds which may be utilized in forming salts of the polyphosphonic acids used in the invention, to make reference to the buffering or pH adjusting compound which may also be included in the aqueous solution used for the removal of magnetite scale. The most general usage of the composition of the invention is carried out under alkaline conditions and, as will be hereinafter explained, for some extremely valuable applications of the method of the invention, maintenance of the pH of the cleaning solution during treatment at a relatively high value is essential. For the purpose of adjusting and maintaining the pH within this frequently desired range of alkalinity during metal treatment, the pH adjusting or buffering material to which reference has been made is added to the aqueous solution. Convenience dictates that the same material be utilized as that which is utilized, in some instances, for formation of the salts of those acids useful in the composition employed in the invention. Thus, the preferred pH adjusting or buffering compounds are amines, including ammonia and ammonium compounds, and alkali metal hydroxides. Of these, the most preferred for general usage is ammonium hydroxide. Others which are suitable include ethylenediamine, sodium hydroxide, potassium hydroxide, lithium hydroxide, monoethanolamine, diethanolamine and triethanolamine.

Although the type of water used in the aqueous solutions containing the active materials described above is not critical to the practice of the invention, there are many applications of the process of the invention which make it desirable on such occasions to use potable water, or water which is as nearly salt-free as possible, such as demineralized water.

The amount of the active acid or salt sequestering compound utilized in practicing the invention may vary over a wide range. Aqueous solutions which contain as little as 0.5 weight percent of the sequestering agents are effective in removing magnetite scale under some temperature and pH conditions. The maximum amount of the sequestrant which may be included in the aqueous solution is limited only by economics, and by the solubility of the selected acid or salt in water, or in an aqueous solution which carries, to the extent required for pH adjustment and maintenance in a given application, one of the buffering materials to which reference has hereinbefore been made. A practical upper limit on the concentration of the preferred polyphosphonic acids in the aqueous solution which is believed to be discernible primarily on the basis of economic considerations is 7.5 weight percent. In general, the most effective and the preferred concentration range of the several sequestrant materials in the aqueous solution, however, is from about 2.5 weight percent to about 6 weight percent. When the most preferred sequestrant, i.e. 1-hydroxyethylidene-1,1-diphosphonic acid, or an operable salt thereof, is utilized, a concentration of from about 1.5 to about 5.0 weight percent is most effective in usage. In this range, the cleaning solution demonstrates excellent iron complexing capability, and has a relatively high carrying capacity for dissolved iron.

The amount of pH adjusting material which is used in the composition will be varied in accordance with the pH at which it is desired to conduct the cleaning operation. Thus, it is appropriate to speak of the amount of pH adjusting or buffering material used in the composition as an effective amount, with it being understood that the most often used pH range over which the process of the invention is carried out is from about 7.0 to about 10.25, and preferably from about 9.0 to about 10.25. It should be noted, however, that the preference for alkaline pH conditions is, to a substantial extent, dictated by customs of the trade which favor alkaline treatment of boilers and related equipment, and that actually highly efficient scale removal is realized in a pH range of from about 4 to about 7. Where an ammonium compound is utilized for pH adjustment, and particularly, ammonium hydroxide, it will usually be desirable to add a sufficient amount of the ammonium compound to commence the cleaning process near the upper end of a pH range over which it is desired to conduct the cleaning. This will then allow for some loss of ammonia by volatilization so that the pH, though it drops some over the period of cleaning, will still be within the desired range at the termination of the cleaning operation.

In addition to the active component of the composition, i.e. the acid or salt sequestrant, and the pH adjusting material, where such is included in the composition, the composition preferably contains a small amount of a corrosion inhibiting compound. This compound functions, in the course of the cleaning procedure, to protect the metal surface from direct attack by the cleaning composition. It is, of course, true that in some occasional metal cleaning applications, the removal of small amounts of metal from the surface being cleaned is not intolerable, but this will rarely be the case, and, in general, about 0.1 weight percent or more corrosion inhibiting compound is included in the composition. An amount of 0.1 percent has usually been found to be sufficient to attain maximum corrosion inhibition. It is particularly important that the inhibitor be included when the scale removal is carried out at relatively high temperatures, i.e. from about 225°F to about 300°F. Typical corrosion inhibiting compounds which can be effectively employed in the compositions of the invention include, but are not limited to, alkyl pyridines, quaternary amine salts and dibutylthiourea, and mixtures of these materials with each other and/or with carrier or surface active materials, such as ethoxylated fatty amines.

As has been previously indicated herein, when one species of the described composition is utilized for scale removal, and the process is carried out within a certain relatively high pH range, copper, as well as magnetite scale, can be removed from the metallic substrate. Since, in many types of water-carrying heat exchange equipment, copper deposition on the internal metal surfaces occurs concurrently with the encrustation of the surface with magnetite scale, this aspect of the invention constitutes a particularly valuable and utilitarian feature thereof. The particular compositions which are useful in the process of the invention for the removal of copper from the metal substrate, in addition to the magnetite scale, are those which contain, in addition to the components previously described, an oxidant which is capable of oxidizing the iron present from a ferrous to ferric valence state. It is necessary that this be accomplished in order for the copper removal to be effective, since the ferrous iron will otherwise be competitive with the copper in reacting with the oxidizing agent. Additionally, a sufficient amount of the oxidant should be present in the composition to oxidize to cupric ions, all of the copper which has been deposited on the metal substrate, and which it is desired to remove. This permits the copper to exist in a valence state which facilitates its complexing with the sequestrant in the solution. Since the amount of the oxidant compound which is included in the compositions for a particular magnetite and copper removal operation will obviously vary widely according to the amount of magnetite and copper scale which is encountered, the amount of oxidizing compound which should be included can only be described as at least an amount sufficient to stoichiometrically oxidize all of the lower valence iron in the scale removing solution at the time after all of the magnetite scale has been removed, and an additional amount which is equal to, or exceeds, the stoichiometric quantity required for reacting with all of the copper metal which is to be removed from the metallic substrate.

A number of types of oxidizing compounds can be included in the scale removal composition when it is to be used for concurrently removing copper and magnetite scale from metal substrates. Typical oxidants which can be effectively employed include, but are not limited to, the alkali metal bromates, the alkali metal peroxides, the alkali metal persulfates, potassium permanganate, hydrogen peroxide, and the alkali metal and ammonium nitrites.

The amount of the scale removal composition which should be employed in carrying out the process of the invention is not susceptible to precise definition since the amount of magnetite scale will vary from one cleaning job to another. Moreover, in no case it is possible to precisely, or even more than very approximately, calculate or estimate the amount of magnetite and/or copper which may be present on a given metallic surface which is to be cleaned. It can be stated, however, that there must be present, a sufficient amount of the scale removal composition that, considering the concentration of the active sequestrant material therein, there is a sufficient amount of the latter material to combine stoichiometrically with the amount of magnetite scale which is present and which is to be removed, and with the amount of copper which is to be removed. Use of amounts of sequestrant in scale removal composition in excess of the stoichiometric amounts described is not deleterious to the operation of the invention, except when a point is reached at which the dissolved acids or acid salts and pH adjusting materials within the aqueous solution unsuitably limit the carrying capacity of this solution for the sequestrant-iron complex which is formed as the scale is removed. This limitation is generally encountered, however, only at a point when economic desiderata have already dictated a limitation to the amount of cleaning solution employed, and the amount of active material which is included in such cleaning solution. It has been found that the reaction between the acid (or salt) sequestrant and the copper-containing scale can be electrochemically monitored, wherein the presence of oxidant is measured. Thus, the absence of oxidant indicates the probability that copper-containing scale is still present.

In the practice of the process of the invention, contact of the scale encrusted boiler, fitting or other metallic element with the scale removal composition is carried out by initially cooling or heating, as the case may be, the metallic member to a temperature within the range of from about 140°F to about 300°F. It is understood that the lower end of this temperature range, 140°F to 180°F, is applicable only in low pH solutions. In terms of general applications and usages, and from the standpoint of scale removal per se, other considerations aside, it is preferred to carry out the cleaning of the metal to remove magnetite scale at a temperature of from about 180°F to about 230°F. This provides a relatively high rate of scale removal with less severe corrosion and ammonia loss than operation at higher temperatures. The most preferred temperature range for general usage in the practice of the process of the invention is from about 190°F to about 220°F.

As is implied from this general description of the commencement of the cleaning process of the invention, the particular temperature at which contact of the scale removal composition with the scale encrusted metallic substrate is initially carried out will be determined in many instances by the temperature at which the boiler or other structure has been operated prior to treatment. Thus, where a boiler has been on stream, and it is desired to shut the boiler down and clean it with a minimum of down time, the boiler will initially be cooled down to a temperature in the upper portion of the operative temperature range specified. On the other hand, where a boiler or other equipment to be cleaned has been off stream, or has been operated under relatively cool or ambient temperature condition, it will then be necessary to heat the structure up to at least 140°F before commencing the scale removal procedure, and time and economic desiderata may mitigate against a further substantial increase in the temperature.

When the metal to be cleaned has been brought to the appropriate temperature, an aqueous solution constituted in accordance with the invention is then introduced to the interior of the boiler, or into contact with the scale encrusted surface. The solution is then preferably slowly circulated with pumps. In most cases, the pH at which the scale removal is to be effected will have already been taken into account by the inclusion of an effective amount of the buffering or pH adjusting material in the cleaning composition. In those instances where the acid sequestrant material hereinbefore described is reacted with a basic amine or alkali metal material to produce a phosphonate salt in situ, the aqueous solution of the acid can be initially located within the boiler, or otherwise in contact with the metallic surface to be cleaned, and the amine or alkali metal hydroxide can then be added to the aqueous solution in an amount sufficient to neutralize the acidic sequestrant, and to further provide the necessary pH adjustment.

As indicated, it is preferable during the contact of the scale removal composition with the metal to be cleaned to maintain circulation of the cleaning composition so that efficient contact is maintained between the active sequestrant compound and the magnetite and/or copper to be removed. From time to time, additional amounts of the cleaning composition can be added to the original quantity placed within the boiler or in contact with the metal so that the capacity of the scale removal composition for dissolving all of the scale to be removed is ultimately sufficient to accomplish this objective.

The time period over which contact is maintained between the cleaning solution and the scale bearing metal can vary widely. In general, a contact time of at least about one hour will be needed. The operative time periods which have been found preferable in most usages range from about 3 hours to about 24 hours. There appears to be no critical limitation on the maximum amount of time that the scale removing composition is in contact with the scale encrusted metal, except that time considerations are, of course, very important in many applications of the invention, since extended downtime on boilers and other heat exchange equipment is directly correlative to an economic loss attributable to such downtime and inoperativeness. It is further noted that in some instances, slight phosphatization of the metallic substrate has been observed to commence to occur when polyphosphonic acids or their salts are used as sequestrants, and contact between the cleaning solution and the metal is maintained in excess of a period of 24 hours. All the described factors being considered, it has been found most desirable to maintain contact between the cleaning solution and the metal to be cleaned over a time period of from about 3 hours to about 8 hours.

It is finally pointed out that, as would be expected, an interrelationship exists between the several process parameters such that variation in one or more of these parameters effects the determination of the most desirable value for another parameter which must be considered in carrying out the process. Thus, in general, carrying out the cleaning process at higher temperatures will reduce the total time of contact which is required between the cleaning solution and the metallic substrate. Moreover, the amount and type of corrosion inhibitor which is included in the composition is dependent upon both the temperature at which the process is carried out (with the higher temperatures generally requiring the inclusion of a relatively larger amount of corrosion inhibitor). The specific amounts of active sequestrant material included in the solution will depend upon the specific sequestrant used, and to some extent, upon the temperature at which the reaction is carried out and the objective of the process, i.e. removal of magnetite scale alone or removal of both magnetite scale, zinc scale and copper deposits.

With respect to the pressure at which the cleaning process of the invention is carried out, the pressure is in no way critical to the operativeness of the process. It has been observed, however, that an advantage is gained by carrying out the method at a pressure slightly in excess of atmospheric pressure in those cases where ammonia or ammonium hydroxide is utilized for the purpose of forming a salt with the acid sequestrant, and for functioning as a pH adjusting or buffering material. In order to prevent volatilization of the ammonia, resulting in a gradual reduction in the pH at which the process is carried out, a superatmospheric pressure extending up to about 50 psig. appears to have beneficial results. To the end of realizing such pressure, closure of the boiler or other vessel in which the process is to be carried out, and operation at autogenic pressure is desirable in those instances where an ammonium compound is utilized in the compositions employed in the invention.

Since one of the most important applications of the present invention is that entailing the removal of both magnetite scale and copper-containing scale from boilers and other structures susceptible to scale encrustation, it is believed that a more detailed description of a preferred practice of the process of the invention when this objective is entailed will further enhance the reader's comprehension of the invention and its merit. Where both magnetite scale and copper are to be removed, an ammonium salt of the polyphosphonic acid is formed, and the salt solution, with its pH adjusted to a value exceeding 7, is initially placed in contact with the metallic member to be treated. Contact, at a temperature of between about 180°F and about 280°F, is maintained from about 1 to 8 hours. This will generally be sufficient to remove all of the magnetite scale. The system, including the metal treated and the cleaning solution, is then cooled down to a temperature at least as low as 150°F, and preferably 140°F, to minimize corrosive attack of the metal.

After cooling the system to the described temperature, sufficient ammonium compound buffering agent is then added to the cleaning solution to adjust the pH to 9 or above, and preferably to about 9.5. The system is then permitted to remain at this temperature and pH for a period up to about 6 hours, and within this time, enough oxidant compound is then added to the solution to oxidize all the iron in the dissolved complex, which is present in the bivalent state, to the ferric or trivalent state, and additionally, to oxidize all of the copper metal adhered to the metal substrate to the cupric state.

It should be understood that the described preferred method of effecting both magnetite and copper removal is not essential to the effective practice of the process of the invention in such a way that both of these metallic species will be removed from a metallic substrate. Thus, the oxidant can be included in the original solution, and a sufficient amount of buffering material is added to adjust the pH thereof to above about 9 prior to initial contact with the solution. The solution as thus constituted is then placed in contact with the metallic substrate and permitted to react with the scale and copper on the substrate for a sufficient period of time, within the broad time range hereinbefore described. In such instances, the same criteria are utilized as to the amount of oxidant which is included in the composition, and the end result of the practice of the invention in this way will be the removal of substantially all of the magnetite and of the majority of the copper from the structure to be cleaned. Practice of the method of the invention in this way, however, while it is simpler and requires less time to carry out, and is more adaptable to higher temperature usage, does not afford the control, and is not as efficient in the overall removal of magnetite and copper, as the two-step procedure described in the preceding paragraphs.

After the completion of the total contact time for the purpose of removing the iron oxide scale and/or copper deposited upon the metallic substrate, the boiler or other structure being cleaned is cooled down to at least 100°F, and preferably ambient temperature, and the spent cleaning composition is then drained from the boiler or removed from contact with the metallic structure. The structure is rinsed with water. The spent scale removal composition is then treated by the addition of a calcium salt to the solution. This results in the formation of an insoluble calcium salt by reaction with the sequestrant material to displace the complexed iron therefrom. The insoluble calcium salt precipitates from the spent aqueous cleaning solution. Immediately following this, or actually concurrently with such precipitation, the iron which has been displaced from the complex will also precipitate from the solution, and easily disposable solid materials are thus recoverable, and the resulting innocuous aqueous solution can be discharged or used in regeneration of fresh cleaning solution.

In a preferred embodiment of the cleanup procedure, the sequestering solution is buffered to a pH of above about 9.0, and a calcium salt selected from the group consisting of calcium chloride, calcium nitrate, calcium sulfate and calcium carbonate is then added to the solution. Shortly after such addition, a precipitate of a calcium complex with the sequestrant compound occurs, followed by precipitation of a hydrous iron oxide. If desired, the remaining solution may then be neutralized and discharged without adverse ecological consequences.

This aspect of the cleanup portion of the process of the present invention can be contrasted with the susceptibility of certain spent scale removal cleaning compositions heretofore in use, in that in many instances, the addition of a calcium salt to such spent cleaning solutions does not result in the formation of an insoluble compound of calcium which will precipitate from the solution. Instead, the calcium salt addition forms simply a complex of the calcium with the sequestrant material used, with such complex being soluble in the solution. Thus, in those instances, no simple, convenient method is available for precipitating from the spent cleaning solution, the various materials dissolved therein which render the spent solution difficult to dispose of in an ecologically satisfactory manner.

The following examples are presented in further illustration of the invention, and should not be regarded as limiting the invention in any way. In the examples, the quantities of materials are expressed as weight percentages unless otherwise indicated. It may be pointed out that in some instances, the data derived from tests of the composition of the invention, and from various experimental practices of the methods of the invention, are not characterized by a high degree of precision or quantitative accuracy. In some instances, it is only possible to affirmatively state that certain scale deposits are apparently completely removed as determined by visual observation, and in other instances, to state that measurements carried out indicate clear trends in the quantity of scale removed by the employment of certain process parameters as compared to others. The necessarily broad and general interpretation of much of the data stems in large measure from the fact that it is not possible, or is extremely difficult, to predetermine the actual quantity of iron which may be present in the total scale deposit on a given piece of apparatus or on a metallic structure. The data does, however, clearly demonstrate the effectiveness of the present invention in the removal of magnetite and copper deposits from a metallic substrate, and the capability of the invention of achieving the primary objectives of its conception and development.

EXAMPLE 1

In a series of scale removal tests, steel nipples are coated with iron oxide scale by roasting in a steam atmosphere at 1000°F for 6 hours. The amount of $Fe_3O_4$ ($Fe_2O_3 \cdot FeO$) roasted on to each nipple is estimated by mesuring the weight gain resulting from roasting. Iron analyses of the spent cleaning solution are performed by X-ray spectrography. Scale removal efficiency is also visually observed. Various types of ammonium polyphosphonate salts are used in various concentrations in the aqueous cleaning compositions, and the runs are carried out at various temperatures. The pH is maintained between 9.0 and 9.1 during the several runs by the use of ammonium hydroxide as a buffering material. There was included in the solution in each run, 0.1 weight percent of a commercially available corrosion inhibiting composition which consists essentially of a mixture of an alkyl pyridine, an ethoxylated fatty amine and dibutylthiourea. The time of contact of the solution with the specimens in each run is 3 hours. The results obtained in these runs are set forth in Table I. In the first column of that table, A has been used to refer to an aqueous solution of 1-hydroxyethylidine-1,1-diphosphonic acid, B has been used to refer to an aqueous solution of nitrilotri-(methylenephosphonic acid), and C has been used to refer to an aqueous solution of N,N,N', N'-ethylenediaminetetra-(methylenephosphonic acid). In the column of Table I which refers to the visual appearance of the treated specimen, U refers to no perceptible scale removal, P refers to partial scale removal and C refers to complete scale removal down to bare metal.

TABLE I

| Sequestrant Used | Concentration Weight Percent | Temperature, °F | Final Visual Appearance of Treated Specimen |
|---|---|---|---|
| A | 0.5 | 180 | U |
| A | 1.5 | 180 | P |
| B | 3.0 | 180 | C |
| C | 2.0 | 180 | P |
| C | 4.0 | 180 | C |
| A | 5.0 | 180 | P |
| B | 5.0 | 180 | C |
| B | 7.5 | 180 | C |
| A | 1.0 | 240 | C |
| B | 1.0 | 240 | P |
| A | 1.5 | 240 | C |
| A | 2.0 | 240 | C |
| B | 2.0 | 240 | C |
| C | 2.0 | 210 | P |
| C | 2.0 | 240 | P |
| A | 2.5 | 240 | C |
| B | 3.0 | 240 | C |
| B | 4.0 | 240 | C |
| C | 4.0 | 210 | C |
| C | 4.0 | 240 | C |
| A | 5.0 | 240 | C |
| B | 5.0 | 240 | C |
| B | 7.5 | 240 | C |

The result of these scale removal runs, as set forth in Table I, demonstrate that the cleaning compositions are effective in magnetite scale removal in sequestrant concentrations of from above 0.5 weight percent up to at least 7.5 weight percent, and at temperatures of from 180°F through 240°F, at a pH of from about 9.0 to about 9.1, using a contact time of about 3 hours. Most effective scale removal is observed at temperatures of from about 210°F to about 240°F, and at sequestrant concentrations of at least 2.5 weight percent.

EXAMPLE 2

A series of test runs are carried out in which a 1 gram sample of magnetite powder is placed in a 250 ml. flask, and 100 ml. of the scale removing solution of the invention is then poured into the flask. The contents of the flask is then boiled under reflux for 3 hours, and the iron content of the solution is then determined as a measure of the magnetite takeup or dissolution.

Several different complexing acids are used in the scale removal solutions tested, and are used in concentrations of from 2 weight percent up to about 5 weight percent. The pH of the several cleaning solutions is adjusted with sodium hydroxide to various selected values ranging from 4 up to 9.5. The results of these tests are set forth in Table II.

The data set forth in Table II show that the sequestering agents employed are effective for complexing the magnetite, and for moving substantial quantities of the magnetite into solution. The 1-hydroxyethylidene-1,1-diphosphonic acid, which is reported in Table II as Sequestrant A, functions effectively over a wider pH range than the other sequestrant acids tested. Moreover, the data shows that in relation to magnetite takeup, the generally most effective pH range, when considered from this standpoint alone, and without regard to corrosivity of the scale removing solutions, is from about 5 to about 6.5. As will be hereinafter pointed out, however, it is desirable in most instances to operate in an alkaline environment, i.e. at a pH above 7. With the inclusion of a suitable corrosion inhibitor, and adjustment of the temperature for most effective scale removal, considerably higher pH values can be very effectively utilized for scale removal. This is, in part, demonstrated by the data set forth in Table I reporting the results of the runs carried out as described in Example 1.

EXAMPLE 3

A series of aqueous scale removal solutions, each of 100 ml., and each containing 5 weight percent active polyphosphonic acid, are adjusted to various pH values between 6 and 10.25 with either sodium hydroxide or ammonia. Following this, 1.0 gram of powdered reagent grade $Fe_3O_4$ is added to each of the scale removal solutions, and the samples are placed in an autoclave thermostated to 212°F. Following a 3 hour heating period at autogenic pressure with constant magnetic stirring, the samples are cooled to ambient temperature, and final pH values are measured. Iron analyses of the solutions are then carried out, either by atomic absorption spectrometer, or by X-ray spectrometer.

The results of these tests are recorded in Table III.

TABLE II

| | Weight of Magnetite ($Fe_3O_4$) Dissolved, grams | | | | | | | | |
|---|---|---|---|---|---|---|---|---|---|
| pH[1] | 2.0 Wt. Percent[2] Sequestrant | | 3.0 Wt. Percent Sequestrant | | 4.0 Wt. Percent Sequestrant | | | 5.0 Wt. Percent Sequestrant | | |
| | A | C | A | C | A | B | C | A | B | C |
| 4.0 | 0.41 | 0.38 | 0.61 | 0.42 | 0.88 | 0.53 | 0.72 | 0.90 | 0.73 | 0.76 |
| 4.5 | — | 0.35 | — | 0.35 | — | 0.62 | 0.60 | — | 0.83 | 0.75 |
| 5.0 | 0.73 | 0.43 | 0.99 | 0.56 | 0.99 | — | 0.89 | 1.00 | — | 0.92 |
| 5.5 | — | 0.39 | — | 0.55 | — | 0.52 | 0.70 | — | 0.70 | 0.96 |
| 6.0 | — | 0.33 | — | 0.60 | — | — | 0.91 | — | — | 0.94 |
| 6.5 | 0.53 | 0.31 | 0.82 | 0.58 | 0.94 | — | 0.70 | 0.96 | 0.25 | 0.86 |
| 7.5 | 0.37 | — | 0.38 | 0.21 | 0.49 | — | 0.34 | 0.70 | 0.02 | 0.45 |
| 8.5 | 0.14 | — | 0.31 | 0.06 | 0.39 | — | 0.06 | 0.76 | — | .06 |
| 9.5 | 0.12 | — | 0.13 | — | 0.19 | — | — | 0.35 | — | — |

[1] pH values are average of pH at start of run and pH at conclusion of run.
[2] Sequestrants A, B & C as used herein are the same sequestrants referred to by these letters in Table I.

TABLE III

| (a) Magnetite Dissolution with Nitrilotrimethylenephosphonic Acid | | | | | |
|---|---|---|---|---|---|
| pH Adjustment with NaOH | | | PH Adjustment with $NH_3$ | | |
| Initial pH | Final pH | Wt. Magnetite Dissolved, gms | Initial pH | Final pH | Wt. Magnetite Dissolved, gms. |
| 6.00 | 6.47 | 0.22 | 6.00 | 7.25 | 0.56 |
| 7.01 | 7.25 | 0.07 | 7.05 | 8.28 | 0.32 |
| 8.01 | 8.32 | 0.05 | 8.20 | 8.68 | 0.25 |
| 9.18 | 9.23 | 0.03 | 9.00 | 9.18 | 0.13 |
| 9.50 | 9.36 | 0.04 | 9.50 | 9.19 | 0.17 |
| 10.08 | 9.77 | 0.02 | 9.96 | 10.17 | 0.05 |
| (b) Magnetite Dissolution with 1-hydroxyethylidine-1,1-diphosphonic Acid | | | | | |
| 6.07 | 6.46 | 0.72 | 6.00 | 6.20 | 0.90 |
| 7.03 | 7.28 | 0.40 | 7.00 | 6.86 | 0.53 |
| 8.30 | 8.25 | 0.06 | 8.00 | 7.74 | 0.55 |
| 9.08 | 9.04 | 0.04 | 9.10 | 8.67 | 0.31 |
| 9.54 | 9.51 | 0.04 | 9.50 | 9.25 | 0.28 |
| 10.16 | 10.11 | 0.04 | 10.00 | 9.76 | 0.24 |

TABLE III—Continued

| | pH Adjustment with NaOH | | | PH Adjustment with NH$_3$ | |
|---|---|---|---|---|---|
| Initial pH | Final pH | Wt. Magnetite Dissolved, gms | Initial pH | Final pH | Wt. Magnetite Dissolved, gms. |

(c) Magnetite Dissolution with N,N,N',N'-ethylenediaminetetramethylenephosphonic Acid

| | | | | | |
|---|---|---|---|---|---|
| 6.03 | 6.20 | 0.76 | 6.03 | 6.28 | 0.77 |
| 7.05 | 7.82 | 0.70 | 7.08 | 7.69 | 0.77 |
| 8.07 | 8.08 | 0.06 | 8.07 | 9.01 | 0.77 |
| 9.03 | 9.06 | 0.04 | 9.00 | 9.30 | 0.36 |
| 9.55 | 9.61 | 0.04 | 9.51 | 9.74 | 0.73 |
| 10.25 | 10.35 | 0.05 | 10.00 | 10.05 | 0.10 |

The data in Table III show that relatively better scale dissolution by the sequestrant solutions occurs from about pH 6 to about pH 8 as compared to higher pH values. Ammonia is clearly superior to the sodium hydroxide as a a buffering material. The performances of 1-hydroxyethylidine-1,1-diphosphonic acid and N,N,N',N'-ethylenediamine tetra-(methylenephosphonic acid) in magnetite dissolution are somewhat better than that of the nitrolotri-(methylenephosphonic acid).

EXAMPLE 4

A 3½ inch outside diameter boiler tubing encrusted with magnetite scale is cut into 1 inch sections which are subsequently split axially into "half moon" sections. These samples are then heated in sealed autoclaves at autogenic pressure in contact with an aqueous solution containing 2.5 weight percent ammonium 1-hydroxyethylidine-1,1-diphosphonic acid buffered to pH 9.0 with ammonium hydroxide. Runs are carried out at various temperatures, and the time of contact is 6 hours in each instance. After the test period, the samples are examined for effectiveness of magnetite removal, and the removal solutions are analyzed for iron content. The results are tabulated in Table IV.

TABLE IV

| Temp., °F | Final Sample Appearance | Fe in Solution, mg/liter |
|---|---|---|
| 160° | Scale was unaffected | 40 |
| 180° | Scale dissolved | 2100 |
| 200° | Scale dissolved | 2900 |

EXAMPLE 5

A series of sections of magnetite encrusted boiler tubing 8 inches to 12 inches in length and 2½ inches in outside diameter are stoppered at one end and filled with an aqueous solution of 2.5 weight percent 1-hydroxyethylidine-1,1-diphosphonic acid buffered with ammonia to pH 9.0. The tubes are heated to various temperatures over differing periods of time. During the scale removal period, the open ends of the tubing sections are covered with a flexible plastic film to minimize loss of ammonia. The results obtained are reproduced in Table V.

TABLE V

| Temp., °F | Time, Hours | Final Sample Appearance | Fe in Solution, mg/liter |
|---|---|---|---|
| 190° | 8 | no dissolution | 300 |
| 200° | 7 | scale dissolved | 4200 |
| 200° | 5 | scale dissolved | 7000 |
| 210° | 7 | scale dissolved | 5900 |
| 210° | 5 | scale dissolved | 2200 |

EXAMPLE 6

In a series of tests, the iron capacity of the preferred scale removal compositions formulated in accordance with the present invention are evaluated, using powdered magnetite. The powder is placed in a 2,000 ml. flask fitted with a water cooled condenser. 1,000 ml. of scale removing solution containing 1-hydroxyethylidine-1,1-diphosphonic acid buffered to a pH of 9.2 with either ammonia or ethylenediamine are charged to the flask, and the solution is heated to boiling. 10 ml. of the solution are removed every hour for the duration of the heating period, and the samples are analyzed by X-ray spectroscopy for iron concentration. The results of these tests are set forth in Table VI.

TABLE VI

| | Milligrams per Liter of Iron Dissolved | | |
|---|---|---|---|
| | Ethylenediamine Buffered | | Ammonia Buffered |
| Heating Time, Hours | 2.0 Wt.% Sequestrant | 2.5 Wt.% Sequestrant | 2.5 Wt.% Sequestrant |
| 1 | 1660 | 2155 | 2090 |
| 2 | 1860 | 2285 | 2615 |
| 3 | 2050 | 2315 | 2565 |
| 4 | 2090 | 2410 | 2860 |
| 5 | 1960 | 2385 | 3225 |
| 6 | 1965 | 2425 | 3400 |
| 7 | 2065 | 2490 | 3520 |
| 8 | 1935 | 2365 | 3395 |
| 9 | 1950 | 2575 | 3775 |
| 10 | 2025 | 2610 | 4045 |
| 11 | 2295 | 2865 | 4740 |
| 12 | 2590 | 2795 | 4985 |
| 13 | 2445 | 2725 | 5055 |
| 14 | 2302 | 2630 | 5405 |
| 15 | 2350 | 2700 | 5605 |
| 16 | 2255 | 2510 | 5471 |
| 17 | 2170 | 2600 | 5600 |
| 18 | 2120 | 2620 | 5770 |
| 19 | 1930 | 2540 | 6320 |
| 20 | 1935 | 2560 | 6500 |

From the data in Table VI it will be seen that a 2.5 weight percent aqueous solution of the sequestrant per-forms better than does the 2.0 weight percent solution, and that better performance is obtained using ammonia as the buffering agent, rather than ethylenediamine.

EXAMPLE 7

In a test generally similar to that described in Example 6, 150 roasted 1 × 2 metal coupons carrying a heavy coating of magnetite scale are placed in 1,000 ml. of a scale removal solution containing 2.5 weight percent 1-hydroxyethylidene-1,1-diphosphonic acid. The solution is buffered to a pH of 9.2 with ammonium hydroxide. The solution is heated to boiling and periodic analyses of the solution for iron content are carried out as described in Example 6. The results are set forth in Table VII.

TABLE VII

| Heating Time, Hours | Milligrams per Liter of Iron Dissolved |
|---|---|
| 1 | 2060 |
| 2 | 2975 |
| 3 | 3490 |
| 4 | 5050 |
| 5 | 7255 |
| 6 | 7685 |
| 7 | 8025 |
| 8 | 9040 |
| 9 | 9870 |
| 10 | 10485 |
| 11 | 10900 |
| 12 | 10980 |

EXAMPLE 8

Magnetite encrusted used boiler tube is sectioned. Aqueous solutions containing varying amounts of 1-hydroxyethylidine-1,1-diphosphonic acid are each buffered to a pH of from 9.0 to 9.4 with ammonia, and inhibited with 0.1 weight percent of a commercially available corrosion inhibitor. In each test, a boiler tube section is immersed in scale removing solution in an autoclave and heated at 210°F for a period of 6 hours. The tube specimen is then visually observed and iron concentration of the solution is measured. The results are set forth in Table VIII.

TABLE VIII

| Wt. Percent Sequestrant | Iron Concentration in Final Solution, mg/l | Final Boiler Tube Appearance |
|---|---|---|
| 2.5 | 2765 | Cleaned |
| 2.0 | 2245 | Cleaned |
| 1.5 | 2065 | Cleaned |
| 1.0 | 1515 | Cleaned |
| 0.5 | 995 | Partially Cleaned |

It is seen that as little as 0.5 weight percent of the 1-hydroxyethylidine-1,1-diphosphonic acid is effective in removing magnetite scale after 6 hours at a temperature of 210°F and pH of 9.0 to 9.4.

EXAMPLE 9

A section of magnetite scaled boiler tube is cut into 1 inch sections, and each section is then quartered. Several of the resulting pieces are placed in a 2 liter flask fitted with a condenser. The flask is then charged with 1 liter of a 3.0 weight percent nitrilotri-(methylenephosphonic acid) solution buffered to pH 9.2 with ethylenediamine and inhibited with 0.1 weight percent corrosion inhibitor. This solution is boiled, and every one-half hour for the first 3 hours, 10 ml. of the solution is removed and analyzed for iron content. After this first 3 hours, such sampling and analysis is carried out every hour up to 8 hours total time. A final sample is withdrawn and analyzed after 12 hours. The time vs. iron dissolution profile is presented in Table IX.

TABLE IX

| Time, Hours | Iron Dissolved Milligrams per liter |
|---|---|
| ½ | 2040 |
| 1 | 3680 |
| 1½ | 4450 |
| 2 | 4980 |
| 2½ | 5360 |
| 3 | 5630 |
| 4 | 6200 |
| 5 | 6540 |
| 6 | 7000 |
| 7 | 7590 |
| 8 | 8310 |
| 12 | 10750 |

At 12 hours there is no evidence of iron precipitation from the solution, nor does any occur after the solution is cooled and allowed to stand for several days.

EXAMPLE 10

Black line pipe is cut into 3 inch sections and thoroughly cleaned inside and out, copper plated on the inside wall, and the sections placed in a furnace at 1000°F and subjected to steam. After 6 hours of roasting, the furnace is allowed to cool overnight, and the magnetite scaled sections are then removed. By calculation on the basis of weight difference, the weight of $Fe_3O_4$ roasted onto the pipe sections varied from 600 mg. to 1100 mg.

The roasted nipples are then placed in autoclaves, and the autoclaves charged with 225 ml. of an aqueous solution containing 2.5 weight percent ammonium 1-hydroxyethylidine-1,1-diphosphonic acid, buffered to a pH of 9.0-9.1 with ammonium hydroxide. The solution contains 0.1 weight percent of a commercially available corrosion inhibitor compound. The autoclaves are sealed and pressured to 50 psig. with air, then placed in pre-heated jackets for periods of time varying from 1 hour to 6 hours, and at temperatures varying from 160°F to 300°F.

Following each cleaning period in the autoclave, the autoclave is cooled and emptied. The scale removing solution is then analyzed for iron by X-ray spectrograph, and the pipe sections are visually inspected for magnetite removal. The results of these cleaning tests are set forth in Table X. The dissolved iron in the final spent sequestrant solution is reported as $Fe_3O_4$.

TABLE X

| Time, Hours | Temp., °F | $Fe_3O_4$ Dissolved, mg. | Visual[1] Appearance |
|---|---|---|---|
| 5 | 160° | 0 | U |
| 6 | 160° | 0 | U |
| 1 | 180° | 0 | U |
| 2 | do. | 670 | P |
| 3 | do. | 765 | C |
| 4 | do. | 1073 | C |
| 5 | do. | 1309 | C |
| 6 | do. | 1244 | C |
| 1 | 200° | 720 | C |
| 2 | do. | 1437 | C |
| 3 | do. | 1390 | C |
| 4 | do. | 1233 | C |
| 5 | do. | 1279 | C |
| 6 | do. | 1312 | C |
| 1 | 220° | 1186 | C |
| 2 | do. | 1093 | C |

TABLE X-Continued

| Time, Hours | Temp., °F | Fe$_3$O$_4$ Dissolved, mg. | Visual[1] Appearance |
|---|---|---|---|
| 3 | do. | 1329 | C |
| 4 | do. | 1708 | C |
| 5 | do. | 1584 | C |
| 6 | do. | 1682 | C |
| 1 | 240° | 1351 | C |
| 2 | do. | 1701 | C |
| 3 | do. | 1749 | C |
| 4 | do. | 1807 | C |
| 5 | 240° | 1699 | C |
| 6 | do. | 1821 | C |
| 1 | 260° | 1073 | C |
| 2 | do. | 1402 | C |
| 3 | do. | 1925 | C |
| 4 | do. | 2128 | C |
| 5 | do. | 2102 | C |
| 6 | do. | 1870 | C |
| 1 | 280° | 1099 | C |
| 2 | do. | 1877 | C |
| 3 | do. | 1757 | C |
| 4 | do. | 2306 | C |
| 5 | do. | 2287 | C |
| 6 | do. | 2488 | C |
| 1 | 300° | 1593 | C |
| 2 | do. | 2413 | C |
| 3 | do. | 2233 | C |
| 4 | do. | 2363 | C |
| 5 | do. | 2640 | C |
| 6 | do. | 2730 | C |

[1] The visual appearance of the pipe sections after treatment is referred to here as C = complete scale removal, P = partial scale removal, U = substantially no scale removal.

EXAMPLE 11

In testing the effectiveness of the aqueous sequestrant composition of the invention in removing copper from ferrous metal substrates, a solution containing 2.5 weight percent 1-hydroxyethylidine-1,1-diphosphonic acid is first neutralized with ammonium hydroxide and then modified by adding ferrous sulfate in an amount sufficient to provide a ferrous ion concentration of 0.64 weight percent. The solution is buffered with ammonium hydroxide to a pH of 9.6. The solutions thus formulated simulate the sequestrant solutions after dissolution of magnetite scale.

Various amounts of three oxidants, sodium nitrite, sodium bromate, and hydrogen peroxide, are then added to the several solutions for copper removal testing purposes. In each test, 225 ml. of solution are added to copper plated mild steel nipples 4 inches in length and 2½ inches inside diameter. The solution is then heated to 150°F and retained at this temperature for 2 hours. The nipples are then removed, washed and are treated with a suitable mineral acid composition for removing substantially all of the copper remaining on the nipples. Both the sequestrant solution and the mineral acid treating composition are submitted to X-ray spectrographic analysis to determine their copper contents. At the conclusion of the tests, the pH of the sequestrant solutions is again checked, and is found to range from 9.2 to 9.3. The results of these copper removal tests are set forth in Table XI.

TABLE XI

| Wt. Percent Oxidant | Weight Copper Removed, mg. | Weight Copper Remaining, mg. | Percent Copper Removed |
|---|---|---|---|
| Using NaNO$_2$ Oxidant | | | |
| 0.28 | 42 | 85 | 36 |
| 0.44 | 77 | 69 | 51 |
| 0.55 | 109 | 13 | 89 |
| 0.88 | 106 | 18 | 85 |
| 1.11 | 99 | 1 | 99 |
| Using NaBrO$_3$ Oxidant | | | |
| 0.22 | 110 | 3 | 97 |
| 0.44 | 106 | 0 | 100 |
| 0.67 | 106 | 0 | 100 |
| 0.89 | 145 | 0 | 100 |
| 1.11 | 47 | 1 | 99 |
| Using H$_2$O$_2$ Oxidant | | | |
| 0.13 | 7 | 126 | 5 |
| 0.20 | 92 | 0 | 100 |
| 0.21 | 118 | 0 | 100 |
| 0.33 | 123 | 1 | 99 |
| 0.40 | 119 | 0 | 100 |

These tests confirm that the sequestrant solutions of the invention function effectively at a relatively high pH (above about 9.2) for the removal of copper fromm ferrous metal, provided that there is sufficient oxidant included in the solution to effectively oxidize all of the iron in solution to the ferric state, as well as to oxidize the copper.

EXAMPLE 12

Four inch sections of 2½ inch inside diameter mild steel tubing are plated with approximately 200 milligrams of copper and roasted at 900°F for 2 hours. The nipples thus prepared are then stoppered at one end and filled with either 2.0 weight percent or 2.5 weight percent aqueous 1-hydroxyethylidine-1,1-diphosphonic acid neutralized and buffered to pH 9 with ammonium hydroxide. In the copper removal tests, either 0.2 gram of NaBro$_3$, or air introduced via a diffuser, is used as an oxidant. After termination of the contact time, the nipples are emptied, rinsed and then the remaining copper on the nipples is removed with a suitable mineral acid composition. The final solution is analyzed for copper content so that the effectiveness of the sequestrant-oxidizer system can be evaluated by difference. The results of these tests are set forth in Table XII.

TABLE XII

| Wt. Percent Sequestrant | Oxidant | Conditions of Exposure | Copper Originally Plated, mg. | Copper Not Removed, mg. |
|---|---|---|---|---|
| 2.0 | NaBrO$_3$ | 190°F for 6 hrs | 186 | 6 |
| 2.5 | NaBrO$_3$ | 190°F for 6 hrs | 183 | 9 |
| 2.5 | Air | 140°F for 3 hrs* | 159 | 11 |
| 2.5 | NaBrO$_3$ | 140°F for 3 hrs* | 166 | 13 |
| 2.0 | NaBrO$_3$ | 140°F for 3 hrs* | 159 | 8 |
| 2.0 | Air | 140°F for 3 hrs* | 156 | 8 |
| 2.5 | NaBrO$_3$ | 140°F for 3 hrs** | 201 | 8 |

* In these runs, the test solutions containing the tubing were first heated at 190°F for 3 hours prior to cooling to 140°F and adding the oxidant.
** In this run, the test solution containing the tubing was first heated to 210°F for 3 hours prior to cooling to 140°F and adding the oxidant.

As shown in Table XII, in all the copper removal runs, the copper removal efficiency exceeded 90 percent.

EXAMPLE 13

0.63 gram of powdered reagent grade zinc oxide is added to 100 ml. of a 2.5 weight percent aqueous solution of 1-hydroxyethylidine-1,1-diphosphonic acid buffered to a pH of 9.0 with ammonium hydroxide. The mixture is then placed in an autoclave and heated to 190°F for a period of 6 hours. All of the zinc oxide is dissolved by the sequestrant solution.

Although certain preferred embodiments of the invention have been herein described for illustrative purposes, it will be appreciated that various modifications and innovations in the procedures and compositions cited may be effected without departure from the basic principles which underlie the invention. Changes of this type are therefore deemed to lie within the spirit and scope of the invention except as the same may be necessarily limited by the appended claims or reasonable equivalents thereof.

What is claimed is:

1. A method for removing iron and copper containing scale from ferrous metal substrates comprising contacting for a period of at least one hour, at a temperature of from about 180°F to about 300°F, and at a pH of from about 9 to about 10.25, the scale bearing substrate with an aqueous solution consisting essentially of water and at least 0.5 weight percent of at least one compound selected from the class consisting of polyphosphonic acids (1) and (2), the amine salts of said polyphosphonic acids and the alkali metal salts of said polyphosphonic acids, acids (1) and (2) being structurally defined as follows:

(1) 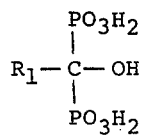

where $R_1$ is selected from the class consisting of $C_1$–$C_{12}$ alkyl groups, and the group

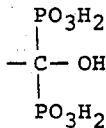

and (2) 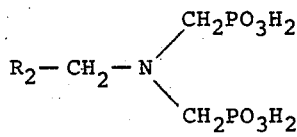

where $R_2$ is selected from the class consisting of —H-, —$PO_3H_2$, $C_1$–$C_{12}$ alkyl groups, and the group

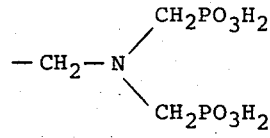

said aqueous solution further including an oxidant compound capable of oxidizing ferrous ions to ferric ions and capable of oxidizing copper to cupric ions, said oxidant compound being present in said aqueous solution in an amount effective to oxidize all ferrous ions present in the solution to ferric ions, and all copper contacted by the solution to cupric ions.

2. The method defined in claim 1 wherein said acids contain from 2 to 6 carbon atoms.

3. A method for removing iron and copper containing scale from ferrous metal substrates as defined in claim 1 wherein said compound present in an amount of at least 0.5 weight percent in said aqueous solution is an ammonium salt of one of said polyphosphonic acids.

4. A method for removing magnetite scale containing copper from metallic substrates comprising contacting at a temperature of from about 180°F to about 280°F and for a period of from about 1 hour to about 8 hours, the scale bearing substrate with an aqueous solution consisting essentially of water and at least 0.5 weight percent of at least one compound selected from the class consisting of organic polyphosphonic acids (1) and (2), the amine salts of said organic polyphosphonic acids and the alkali metal salts of said organic polyphosphonic acids, acids (1) and (2) being structurally defined as follows:

(1) 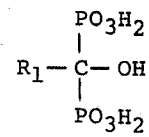

where $R_1$ is selected from the class consisting of $C_1$–$C_{12}$ alkyl groups, and the group

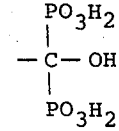

and (2) 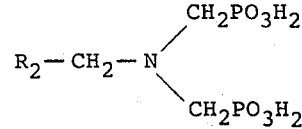

where $R_2$ is selected from the class consisting of —H-, —$PO_3H_2$, $C_1$–$C_{12}$ alkyl groups, and the group

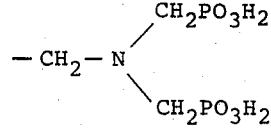

and wherein said method is further characterized in including the subsequent steps of:

cooling the aqueous solution to a temperature of at least as low as 150°F;

adding an effective amount of a buffering compound to adjust the pH of the aqueous solution to at least 9.0;

adding an oxidant compound to the aqueous solution in an amount effective to oxidize all ferrous ions present in the solution to ferric ions, and all copper contacted by the solution to cupric ions; and after said addition, maintaining contact between said solution and said scale bearing substrate for a period of time sufficient to remove adhered copper from the substrate.

5. A method as defined in claim 4 wherein said compound present in an amount of at least 0.5 weight percent in said aqueous solution is an ammonium salt of one of said organic polyphosphonic acids.

6. A method as defined in claim 4 wherein said buffering compound is ammonium hydroxide.

7. The method for removing scale as defined in claim 4 wherein after cooling the solution, the pH thereof is adjusted to a value of about 9.5.

8. The method for removing scale as defined in claim 4 wherein said aqueous solution consists essentially of water and ammonium 1-hydroxyethylidine-1,1-diphosphonate.

9. The method for removing scale as defined in claim 4 wherein said initial contact is carried out at a temperature of from about 190°F to about 230°F.

10. The method for removing scale as defined in claim 4 wherein after said initial contact period of from one hour to 8 hours, said solution is cooled to a temperature of about 140°F.

11. The method for removing scale as defined in claim 10 wherein said oxidant is selected from the group consisting of sodium bromate, sodium nitrite and hydrogen peroxide.

12. The method for removing scale as defined in claim 11 wherein after cooling the solution, the pH thereof is adjusted to from about 9.0 to about 10.2.

13. The method for removing scale as defined in claim 12 wherein said aqueous solution consists essentially of water and ammonium 1-hydroxyethylidine-1,1-diphosphonate.

14. The method for removing scale as defined in claim 13 wherein said initial contact is carried out at a temperature of from about 190°F to about 230°F.

* * * * *